US009360125B2

(12) United States Patent
Jefford et al.

(10) Patent No.: US 9,360,125 B2
(45) Date of Patent: Jun. 7, 2016

(54) TURBO PURGE VALVE-CHECK VALVE OBD VACUUM RELIEF

(71) Applicant: Continental Automotive Systems, Inc., Auburn Hills, MI (US)

(72) Inventors: Robert Douglas Jefford, Chatham (CA); John Nelson Lloyd, Canton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 221 days.

(21) Appl. No.: 14/258,253

(22) Filed: Apr. 22, 2014

(65) Prior Publication Data

US 2014/0311602 A1    Oct. 23, 2014

Related U.S. Application Data

(60) Provisional application No. 61/815,079, filed on Apr. 23, 2013.

(51) Int. Cl.
  *F02M 33/02*    (2006.01)
  *F16K 15/18*    (2006.01)
  (Continued)

(52) U.S. Cl.
  CPC ............ *F16K 15/186* (2013.01); *F02M 25/089* (2013.01); *F02M 25/0836* (2013.01); *F16K 31/02* (2013.01); *F02M 25/0818* (2013.01); *F02M 2025/0845* (2013.01); *Y10T 137/6855* (2015.04); *Y10T 137/86485* (2015.04); *Y10T 137/87981* (2015.04)

(58) Field of Classification Search
  CPC .... F16K 15/186; F16K 31/02; F02M 25/089; F02M 25/0836; F02M 25/0818; F02M 2025/0845; Y10T 137/87981; Y10T 137/6855; Y10T 137/86485
  USPC ........................................................ 123/520
  See application file for complete search history.

(56) References Cited

U.S. PATENT DOCUMENTS

| 5,005,550 A | * | 4/1991 | Bugin, Jr. ............. F02M 25/089 123/520 |
| 5,511,529 A | | 4/1996 | Blumenstock et al. |

(Continued)

FOREIGN PATENT DOCUMENTS

| DE | 102010044526 A1 | 5/2011 |
| WO | 2013034380 A1 | 3/2013 |
| WO | 2013187912 A1 | 12/2013 |

OTHER PUBLICATIONS

PCT/US2014/035102—The International Search Report and Written Opinion of the International Searching Authority dated Aug. 20, 2014.

*Primary Examiner* — Hai Huynh

(57) ABSTRACT

An integrated valve assembly, which integrates two check valves and a solenoid assembly which functions as a purge valve. When the solenoid assembly is in an open position, during a first mode of operation, vacuum pressure places the first check valve in an open position and the second check valve in a closed position, and during a second mode of operation, pressurized air places the first check valve in a closed position, and vacuum pressure generated by a venturi valve member places the second check valve in an open position. Each check valve utilizes a nylon insert along with an over molded rubber seal. The design of the check valves prevents actuation at low vacuums and flows when the vehicle is shut off. The integrated valve assembly eliminates the need for an OBD relief valve, and simplifies the EVAP system, saving costs, complexity, and eliminates several possible leak connections.

41 Claims, 3 Drawing Sheets

(51) Int. Cl.
*F16K 31/02* (2006.01)
*F02M 25/08* (2006.01)

(56) References Cited

U.S. PATENT DOCUMENTS

| | | | | |
|---|---|---|---|---|
| 7,373,930 B1 * | 5/2008 | Hadre | ................ | F02M 25/0836 123/198 D |
| 9,086,036 B2 * | 7/2015 | Inoguchi | ............ | F02M 25/0836 |
| 9,109,552 B2 * | 8/2015 | Williams | .............. | F02M 25/089 |
| 9,206,771 B2 * | 12/2015 | Williams | ............ | F02M 25/0836 |
| 2013/0019844 A1 * | 1/2013 | Kulkarni | .......... | B60K 15/03504 123/520 |
| 2013/0051935 A1 | 2/2013 | Schuffenhauer et al. | | |
| 2013/0152904 A1 * | 6/2013 | Balsdon | ............. | F02M 25/0836 123/518 |
| 2014/0326337 A1 * | 11/2014 | Jefford | .................... | F02B 37/16 137/487.5 |

* cited by examiner

TURBO PURGE VALVE-CHECK VALVE OBD VACUUM RELIEF

CROSS-REFERENCE TO RELATED APPLICATIONS

This application claims the benefit of U.S. Provisional Application No. 61/815,079 filed Apr. 23, 2013. The disclosure of the above application is incorporated herein by reference.

FIELD OF THE INVENTION

The invention relates generally to an integrated valve assembly which is capable of providing venting from a carbon canister, as well as providing venting from the fuel EVAP system during on-board diagnostic testing.

BACKGROUND OF THE INVENTION

Purge systems are generally known and are used in different types of vehicles. Some types of turbo purge systems in vehicles equipped with turbocharging units use two check valves located remotely from a turbo purge valve to control turbo pressure and intake vacuum respectively to supply a source vacuum to a canister purge valve. The pressurized air generated by the turbocharger is forced into the engine to increase combustion pressure, and therefore increase the power generated by the engine. With some tubocharging systems, a portion of the pressurized air is bled off to create a vacuum and induce flow of purge vapor. The vacuum created is used as part of a purge system, where the purge system directs purge vapors from a fuel tank through various conduits to redirect the vapors into the intake manifold of the engine, and burn off these vapors through combustion.

The types of check valves used in these systems commonly check at very low vacuum pressure levels. Because these check valves check at such low vacuum pressure, it is difficult to use these valves to vent the fuel tank system and stabilize to atmospheric conditions prior to initiating the small leak test for on-board diagnostic (OBD) compliance.

To overcome this issue, these types of systems typically require a separate OBD relief valve to vent the fuel evaporative emissions (EVAP) system when the vehicle is shut off. The valve is necessary to conduct the OBD test. However, the inclusion of this valve adds complexity and cost to the system.

Accordingly, there exists a need for a valve assembly which is able to vent the fuel tank system, and allow the fuel tank system to stabilize to atmospheric conditions, as well as perform an OBD test, and control turbo pressure and intake vacuum pressure supplied to a turbo purge valve.

SUMMARY OF THE INVENTION

The present invention is an integrated valve assembly, which integrates two check valves and a purge valve. Each check valve utilizes a nylon insert along with an over molded rubber seal. The added mass and design of the check valves prevents actuation at low vacuums and flows when the vehicle is shut off.

To further accelerate EVAP system bleed down, drive software pulses the purge valve to create a pressure differential across the purge valve, and the resulting pressure pulses provide momentum to the check valves because of the increased mass and design of the check valves, which prevents checking.

The integrated valve assembly of the present invention eliminates the need for an OBD relief valve, and simplifies the EVAP system, saving costs, complexity, and eliminates several possible leak connections.

In one embodiment, the present invention is a turbo purge valve assembly which includes an overmold assembly having an overmold assembly cavity, a solenoid assembly located in the overmold assembly adjacent the overmold assembly cavity, a cap connected to the overmold assembly, a reservoir connected to the cap, and a reservoir cavity formed as part of the reservoir. A cap aperture is formed as part of the cap, such that the cap aperture provides fluid communication between the overmold assembly cavity and the reservoir cavity when the solenoid assembly is in an open position. The turbo purge valve assembly also includes a first check valve connected to the reservoir and in fluid communication with an intake manifold and the reservoir cavity, and a second check valve connected to the reservoir and in fluid communication with a venturi valve member and the reservoir cavity.

During a first mode of operation and when the solenoid assembly is in an open position, vacuum pressure places the first check valve in an open position and the second check valve in a closed position. During a second mode of operation and when the solenoid assembly is in an open position, pressurized air places the first check valve in a closed position, and vacuum pressure generated by the venturi valve member places the second check valve in an open position.

The first check valve includes a first valve plate moveable between an open position and a closed position, a first seal member connected to and circumscribing the first valve plate, and a first valve seat selectively in contact with the first seal member. A first check valve aperture is in fluid communication with the reservoir cavity, and the first check valve aperture is at least partially surrounded by the first valve seat. The first check valve also includes a first base portion, a first inner wall formed as part of the first base portion, and the first seal member is selectively in contact with the first inner wall. The first check valve also has a first plurality of vents formed as part of the first base portion, and a first check valve cavity, the first plurality of vents and the first check valve aperture are in fluid communication with the first check valve cavity. A first vent port is integrally formed with the first base portion, and a first guide member at least partially extends into the reservoir cavity and partially extends into the first vent port, and the first valve plate is integrally formed with the guide member.

The first valve plate is located in the first check valve cavity, and during the first mode of operation, the first valve plate is exposed to vacuum pressure from the intake manifold, which causes the first valve plate to move toward and contact the first inner wall, placing the first check valve is in the open position, allowing purge vapor to flow from the reservoir cavity through the first check valve aperture, through the first check valve cavity, and through the first plurality of vents and out of the first vent port. During the second mode of operation, pressurized air places the first valve plate in contact with the first valve seat, preventing purge vapor from entering the first check valve cavity from the reservoir cavity.

The second check valve is constructed similarly to the first check valve, and the second check valve includes a second valve plate moveable between an open position and a closed position, a second seal member connected to and circumscribing the second valve plate, and a second valve seat selectively in contact with the second seal member. A second check valve aperture is in fluid communication with the reservoir cavity, and the second check valve aperture surrounded by the second valve seat. The second check valve also includes a second base portion, a second inner wall formed as part of the second base portion, and the second seal member is selectively in contact with the second inner wall. The second check valve also includes a second plurality of vents formed as part of the second base portion, and a second check valve cavity, the second plurality of vents and the second check valve aperture are in fluid communication with the second check valve cavity. A second vent port is integrally formed with the base portion, and a second guide member at least partially extends into the reservoir cavity and partially extends into the second vent port, and the second valve plate integrally formed with the second guide member.

The second valve plate is located in the second check valve cavity, and during the first mode of operation, the second valve plate is exposed to vacuum pressure in the reservoir cavity, which places the second valve plate in contact with the second valve seat, preventing purge vapor from entering the second check valve cavity from the reservoir cavity. During the second mode of operation, the second valve plate is exposed to vacuum pressure from the venturi valve assembly, which moves the second valve plate toward and in contact with the second inner wall, placing the second check valve in the open position, allowing purge vapor to flow from the reservoir cavity through the second check valve aperture, through the second check valve cavity, and through the second plurality of vents and out of the second vent port.

In one embodiment, the turbo purge valve assembly of the present invention is used with an air flow system for a vehicle. The air flow system includes a turbocharger unit for generating the pressurized air such that a portion of the pressurized air flows into the first check valve of the turbo purge valve assembly during the second mode of operation. The air flow system also includes a canister containing purge vapor, which is in fluid communication with the turbo purge valve assembly. A pressure sensor is used for detecting a change in pressure in the canister. The turbo purge valve assembly is part of the air flow system, and performs an on-board diagnostic test for detecting a malfunction in the air flow system. During the on-board diagnostic test, the air flow system is in the second mode of operation, and the turbocharger unit is generating pressurized air, the solenoid assembly is placed in the closed position. If the system is functioning properly, there is no change in pressure in the canister when the solenoid assembly is changed to the closed position because the canister and the turbo purge valve assembly are sealed components. If the pressure sensor detects change in pressure in the canister, this is an indication of a malfunction, such as a leak, in the canister, the turbo purge valve assembly, or some other component, when a change of pressure occurs.

In one embodiment, the turbo purge valve assembly also includes a canister vacuum relief function, where the solenoid assembly is pulsated after the vehicle is shut off. The pulsation of the solenoid assembly generates an air pulsation in the reservoir cavity, opening one of the first check valve or the second check valve, allowing air to pass from either of the first vent port or the second vent port into the reservoir cavity, through the solenoid assembly, through the overmold assembly cavity, and into the canister to relieve vacuum pressure in the canister.

The turbo purge valve assembly also includes the features having the ability to reduce or eliminate turbo lag which occurs during the initial activation of the turbocharger unit. The first check valve is unbiased towards the open position or the closed position, and the second check valve is also unbiased towards the open position or closed position, allowing both the first check valve and the second check valve to transition between open and closed positions from the application of the pressurized air or vacuum pressure, reducing turbo lag as the turbocharger is activated and deactivated.

In other embodiments, the turbo purge valve assembly is oriented such that gravity biases the first check valve to the open position, or the turbo purge valve assembly is oriented such that gravity biases the first check valve to the closed position. In yet other alternate embodiments, the turbo purge valve assembly is oriented such that gravity biases the second check valve to the open position, or the turbo purge valve assembly is oriented such that gravity biases the second check valve to the closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
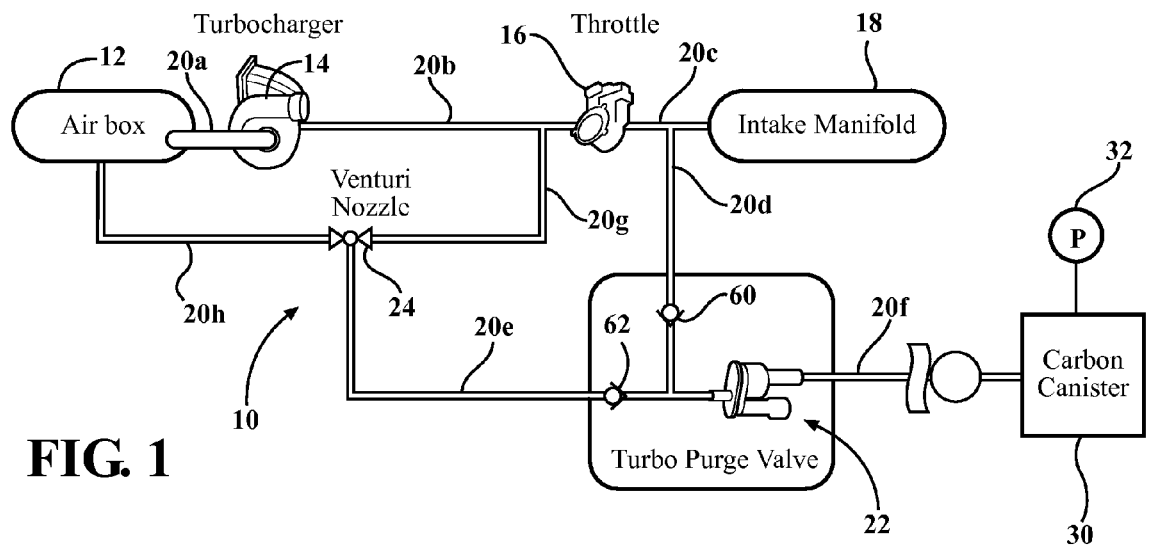
FIG. 1 is a diagram of an air flow system having a turbo purge valve assembly, according to embodiments of the present invention.

A diagram of an airflow system of a vehicle having a turbo purge valve assembly according to the present invention is shown generally in FIG. 1 at 10. The system 10 includes an air box 12 which intakes air from the atmosphere. Located downstream of and in fluid communication with the air box 12 is a turbocharger unit 14, and located downstream of and in fluid communication with the turbocharger unit 14 is a throttle assembly 16. The throttle assembly 16 controls the amount of air flow into an intake manifold 18, which is part of an engine.

A plurality of conduits also provides fluid communication between the various components. Air flows through the conduits between the various components, and the direction of airflow through the conduits varies, depending on the mode of operation of each component. More specifically, there is a first conduit 20a providing fluid communication between the air box 12 and the turbocharger 14, a second conduit 20b providing fluid communication between the turbocharger 14 and the throttle assembly 16, and there is also a third conduit 20c providing fluid communication between the throttle assembly 16 and the intake manifold 18.

A fourth conduit 20d is in fluid communication with the third conduit 20c and a turbo purge valve assembly 22, and a fifth conduit 20e places the turbo purge valve assembly 22 in fluid communication with a venturi valve assembly 24. The turbo purge valve assembly 22 includes a first check valve 60 in fluid communication with the fourth conduit 20d, and a second check valve 62 in fluid communication with the fifth conduit 20e. There is also a carbon canister 30 in fluid communication with the turbo purge valve assembly 22 through the use of a sixth conduit 20f.

A seventh conduit 20g provides fluid communication between the venturi valve assembly 24 and the second conduit 20b, such that pressurized air is able to flow from the second conduit 20b, through the seventh conduit 20g and to the venturi valve assembly 24. An eighth conduit 20h provides fluid communication between the venturi valve assembly 24 and the air box 12.

Figure 2:
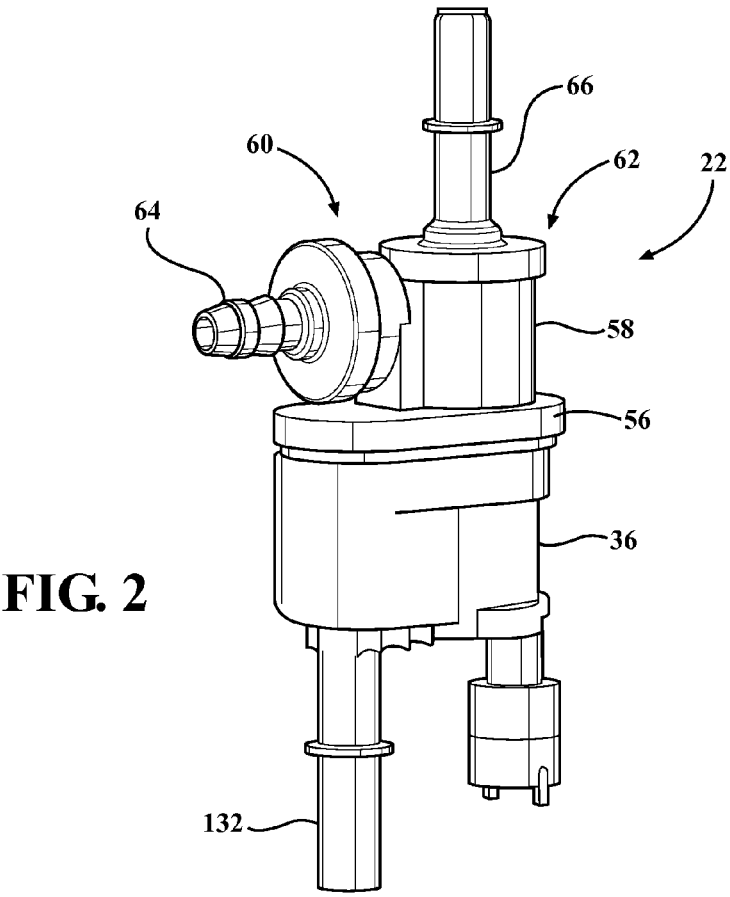
FIG. 2 is a perspective view of a turbo purge valve assembly, according to embodiments of the present invention.
Figure 3:
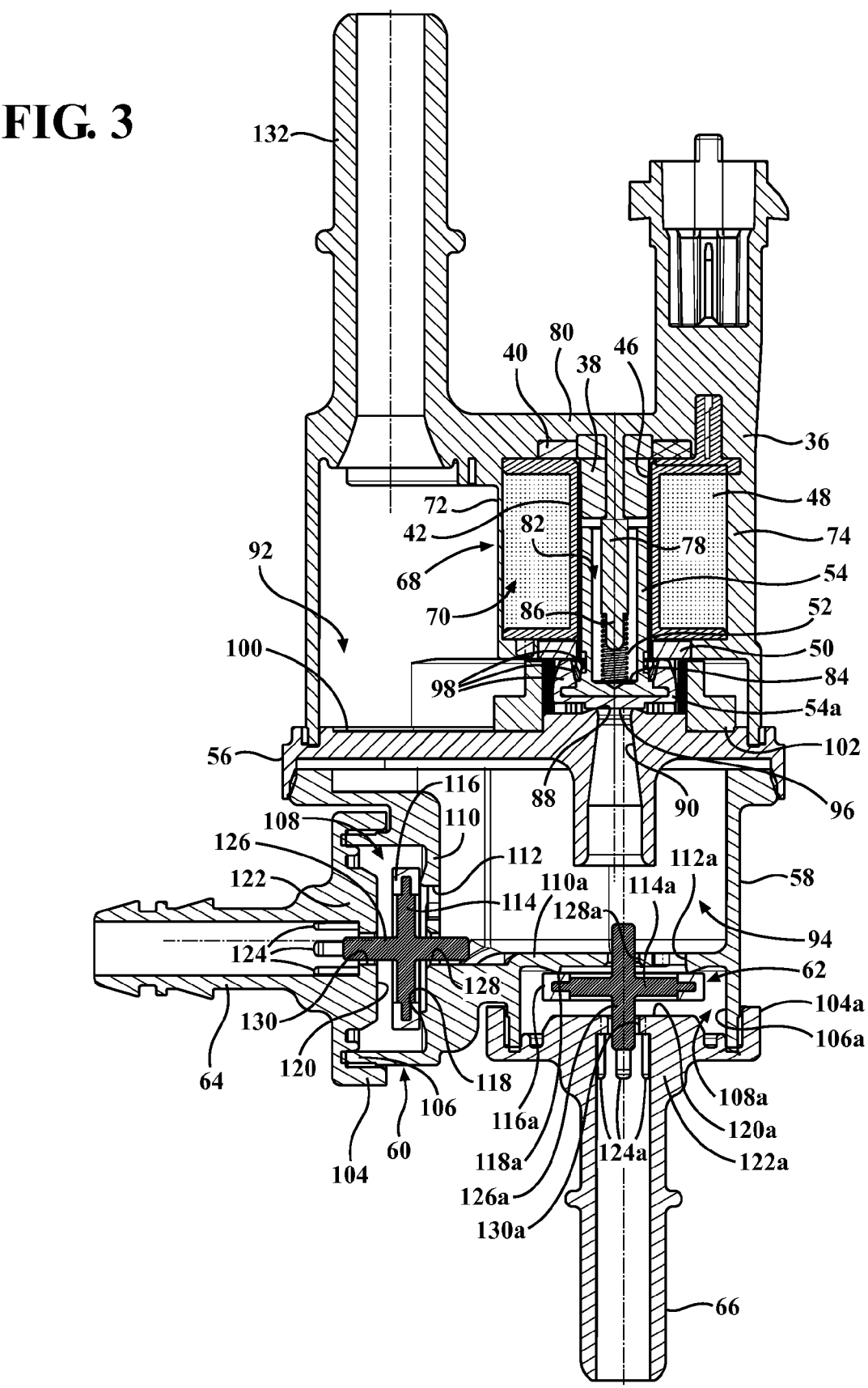
FIG. 3 is a sectional side view of a turbo purge valve assembly, according to embodiments of the present invention.
Figure 4:
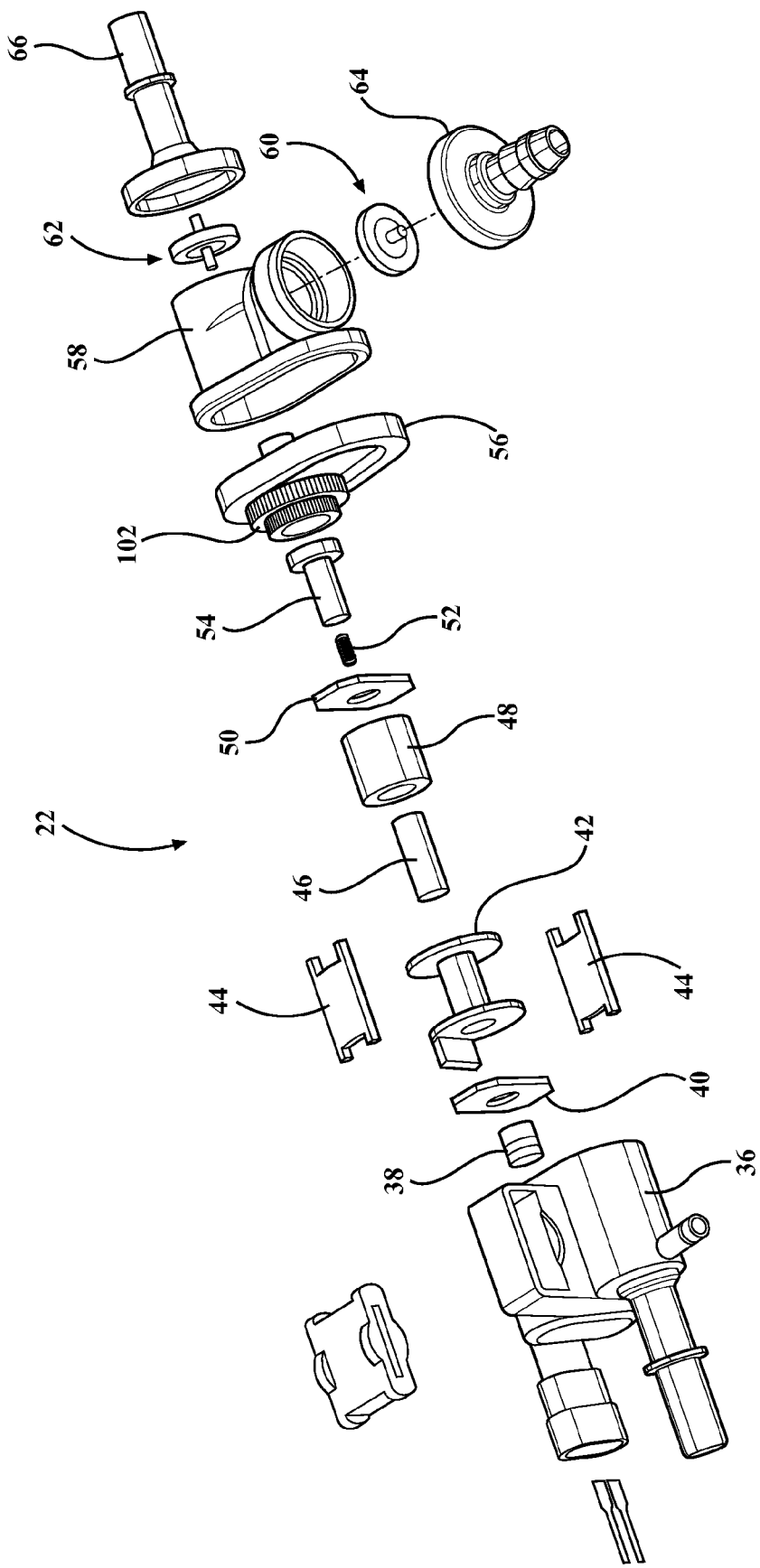
FIG. 4 is an exploded view of a turbo purge valve assembly, according to embodiments of the present invention.

Referring to FIGS. 2-4, the turbo purge valve assembly 22 includes an overmold assembly 36, and disposed within the overmold assembly 36 is a solenoid assembly, shown generally at 68, and the solenoid assembly 68 is disposed within a cavity, shown generally at 70, formed as part of the overmold assembly 36, and the cavity includes an inner wall portion 72, and also forming part of the cavity 70 is an outer wall portion 74 of the overmold assembly 36.

The solenoid assembly 68 includes a stator insert 38 which surrounds a support 78 formed as part of the overmold assembly 36. A first washer 40 is disposed between an upper wall 80 of the overmold assembly 36 and a bobbin 42. The bobbin 42 is surrounded by a coil 48, and two straps 44 surround the coil 48. There is a sleeve 46 which is surrounded by the bobbin 42, and the sleeve 46 partially surrounds a moveable armature 54. The armature 54 includes a cavity, shown generally at 82, and located in the cavity 82 is a spring 52, which is in contact with an inner surface 84 of the cavity 82. The spring 52 is also mounted on a narrow diameter portion 86 of the support 78. Disposed between part of the armature 54 and the bobbin 42 is a second washer 50. Connected to the overmold assembly 36 is a cap 56, and formed as part of the cap 56 is a valve seat 88 and a cap aperture 90, where purge vapor is able to flow from an overmold assembly cavity, shown generally at 92, formed as part of the overmold assembly 36 and through the cap aperture 90.

The armature 54 includes a stopper portion 54a which is made of a rubber or other flexible material. The stopper portion 54a includes a contact surface 96 which contacts the valve seat 88 when the armature 54 is in the closed position. The stopper portion 54a includes a plurality of post members 98 are of the same durometer, but are of different sizes, and therefore have different levels of stiffness. The largest post members 98 are in contact with the bottom surface of the washer 50 when the armature 54 is in the closed position, as shown in FIG. 3. The smaller post members 98 contact the bottom surface of the washer 50 when the armature 54 moves to the open position. The more the coil 48 is energized, the further the armature 54 moves away from the valve seat 88, and the greater number of post members 98 contact the bottom surface of the washer 50. The movement of the armature 54 to open and close the solenoid assembly 68 controls the amount of purge vapor allows to pass through the turbo purge valve assembly 22, and into the intake manifold 18.

Because the post members 98 are made of rubber, the post members 98 are able to deform as the armature 54 is moved further away from the valve seat 88. The largest post members 98 in contact with the bottom surface of the washer 50 deform first when the armature 54 moves away from the valve seat 88. As the armature 54 moves further away from the valve seat 88, more of the post members 98 contact the bottom surface of the washer 50, and then begin to deform as the armature 54 moves even further away from the valve seat 88. The deformation of the post members 98 (when the armature 54 is moved to the open position away from the valve seat 88) functions to dampen the movement of the armature 54, eliminating noise, and preventing metal-to-metal contact between the armature 54 and the stator insert 38.

Disposed between the bottom surface of the washer 50 and an inside surface 100 of the cap 56 is a filter 102. The filter 102 is made of several blades of plastic which are adjacent one another. The filter 102 is designed to limit the size of debris and particles passing through the blades of plastic to less than 0.7 millimeters. The distance between the armature 54 and the stator insert 38 is about 1.0 millimeters, and is the maximum allowable distance between the contact surface 96 of the stopper portion 54a and the valve seat 88. The filter 102 ensures that no particles may pass through the filter 102 that are too large to affect the functionality of the solenoid assembly 68 (the particles being too large to fit between the valve seat 88 and the stopper portion 54a) when the armature 54 is in the open position.

The aperture 90 is also in fluid communication with a reservoir cavity, shown generally at 94, formed as part of a reservoir 58. The cavity 94 is also in fluid communication with a first check valve 60 and a second check valve 62. The first check valve 60 includes a first vent port 64, and the second check valve 62 includes a second vent port 66. The check valves 60,62 and the vent ports 64,66 are substantially similar.

The first vent port 64 of the first check valve 60 includes a first cap portion 104 which is connected to a first flange portion 106 formed as part of the reservoir 58. The connection between the cap portion 104 and the flange portion 106 may be any suitable connection, such as snap-fitting, welding, an adhesive, or the like. The connection between the cap portion 104 and the flange portion 106 forms a first check valve cavity, shown generally at 108, and formed as part of a first side wall 110 of the reservoir 58 is a first check valve aperture 112, which allows for fluid communication between the cavity 108 and the cavity 94 when the first check valve 60 is in an open position.

The first check valve 60 also includes a first valve member 114, which in this embodiment is a first valve plate 114, located in the first check valve cavity 108, and includes a first seal member 116 that selectively contacts a first valve seat 118 and a first inner wall 120 of the cap portion 104. The valve seat 118 at least partially surrounds the aperture 112, and no air passes around the valve plate 114 when the seal member 116 is in contact with the valve seat 118, where the first check valve 60 is in the closed position. The inner wall 120 is part of a first base portion 122, and formed as part of the base portion 122 is a first plurality of vents 124 which are in fluid communication with the cavity 108, such that when the seal member 116 is not in contact with the valve seat 118, purge vapor is able to flow from the cavity 94 through the aperture 112 into the cavity 108, and through the vents 124 and into the first vent port 64.

Formed with the valve plate 114 is a first guide member 126, which is cylindrical in shape, and partially extends into an aperture 128 formed as part of the side wall 110, and also partially extends into another aperture 130 formed as part of the base portion 122. The first guide member 126 is able to slide freely in the apertures 128,130, and does not bias the valve plate 114 in a particular direction. The guide member 126 is able to slide freely in the apertures 128,130 because there is a clearance between the outer diameter of the guide member 126 and the diameter of each of the apertures 128, 130, and this clearance allows for some of the purge vapor to pass through the apertures 128,130. However, when the seal member 116 is in contact with the valve seat 118, purge vapor flowing through the clearance around the guide member 126 in the aperture 128 or through the aperture 112 does not flow around the valve plate 114 or the seal member 116.

The second check valve 62 includes similar components to the first check valve 60, and functions in a similar manner. The components of the second check valve 62 includes a second cap portion 104a connected to the second flange portion 106a of the reservoir 58, and a second check valve cavity, shown generally at 108a, formed by the connection of the cap portion 104a to the second flange portion 106a. A second side wall 110a is also formed as part of the reservoir 58, and a second check valve aperture 112a is formed as part of the second side wall 110a to provide fluid communication between the cavity 94 and the second check valve cavity 108a. The second valve member 114a having a second seal member 116a is located in the second check valve cavity 108a and selectively contacts the valve seat 118a formed as part of the side wall 110a and the inner wall 120a formed as part of the a base portion 122a. The base portion 122a and the second cap portion 104a are part of the second vent port 66. Similarly to the first base portion 122, there is a second plurality of vents 124a formed as part of the second base portion 122a. A second guide member 126a is integrally formed with the valve plate 114a, and the second guide member extends into the aperture 128a formed as part of the second side wall 110a and the aperture 130a formed as part of the second base portion 122a.

The air flow system 10 has multiple modes of operation. In a first mode of operation, when the turbocharger 14 is not active, air flows through the air box 12, the turbocharger 14, the throttle 16, and into the intake manifold 18. There is vacuum pressure in the intake manifold 18 created by the engine during the first mode of operation, drawing air into the intake manifold 18. This vacuum pressure is also in the fourth conduit 20d, and when the solenoid assembly 68 is in the open position, the vacuum causes the first check valve 60 to open, where during the first mode of operation, the vacuum pressure draws the valve plate 114 away from the valve seat 118 and toward the inner wall 120, such that the seal member 116 contacts the inner wall 120, allowing purge vapor to pass from canister 30, through the sixth conduit 20f, the cavity 92 of the overmold assembly 36 from an inlet port 132 connected to the sixth conduit 20f, the aperture 90, the cavity 94 of the reservoir 58, through the aperture 112, the valve cavity 108, through the vents 124, the first vent port 64 and into the fourth conduit 20d. The purge vapor from flows through the fourth conduit 20d, through the third conduit 20c where the purge vapor mixes with air and flows into the intake manifold 18. This same vacuum pressure also causes the second check valve 62 to close, where the vacuum pressure in the cavity 94 of the reservoir 58 draws the second valve plate 114a towards the second valve seat 118a, such that the second seal member 116a contacts the valve seat 118a, and the purge vapor does not pass through the second check valve 62.

The air flow system also has a second mode of operation, where the turbocharger 14 is activated, and air flowing into the turbocharger 14 from the air box 12 is pressurized, the pressurized air flows through the throttle 16, and the air then flows into the intake manifold 18. In this second mode of operation, the manifold 18 is operating under positive pressure. Some of this pressurized air flows into the fourth conduit 20d, and into the first vent port 64. During the second mode of operation, the pressurized air then flows through the vents 124 and into the first check valve cavity 108 and applies pressure to the first valve plate 114, moving the valve plate 114 towards the valve seat 118 such that the seal member 116 contacts the valve seat 118, placing the first check valve 60 in the closed position.

When the turbocharger 14 is activated during the second mode of operation, and pressurized air is passing through the seventh conduit 20g, the venturi valve assembly 24, and the eighth conduit 20h. The pressurized air flowing through the venturi valve assembly 24 also creates vacuum pressure in the fifth conduit 20e, where air is drawn from the fifth conduit 20e into venturi valve assembly 24, such that the air passes through the eighth conduit 20h and into the air box 12. During the second mode of operation, this vaccum pressure in the fifth conduit 20e also draws the second valve plate 114a away from the second valve seat 118a and towards the inner wall 120a of the base portion 122a, placing the second check valve 62 in an open position. During the second mode of operation, purge vapor from the canister 30 passes through the sixth conduit 20f, the cavity 92 of the overmold assembly 36 from the inlet port 132 connected to the sixth conduit 20f, the aperture 90 (when the solenoid assembly 68 is in the open position), the cavity 94 of the reservoir 58, through the aperture 112a, the valve cavity 108a, through the vents 124a, the second vent port 66 and into the fifth conduit 20e. The purge vapor flows into the venturi valve assembly and mixes with the pressurized air in the eighth conduit 20h, and flows into the air box 12. The purge vapor and air mixture then flows through the turbocharger 14, the throttle 16, and into the intake manifold 18.

The orientation of the turbo purge valve assembly 22 also has an effect on the operation of the turbo purge valve assembly 22, since there are no springs or other biasing members in either of the check valves 60,62 to bias either of the check valves 60,62 to an open or closed position. In the embodiment shown in FIG. 1, gravity biases the valve plate 114 of the first check valve 60 downward (towards the first valve seat 118), and therefore towards the closed position. However, it is within the scope of the invention that the turbo purge valve assembly 22 may be oriented such that gravity may bias the first valve plate 114 toward either the first valve seat 118 or the inner wall 120. It is also within the scope of the invention that the turbo purge valve assembly 22 may be oriented such that gravity may bias the second valve plate 114a toward either of the second valve seat 118a or the second inner wall 120a. The turbo purge valve assembly 22 is shown in different orientations in FIGS. 1-4, where gravity biases the check valves 60,62 to either the open or closed positions, depending on the orientation of the valve assembly 22.

Furthermore, the free movement of each of the valve plates 114,114a in the respective check valve cavities 108,108a also provides the advantage of reducing or eliminating turbo lag. Because there is no biasing member which biases either of the valve plates 114,114a towards an open or closed position, the valve plates 114,114a change position quickly between the open and closed positions as the manifold 18 changes from operating under vacuum pressure to positive pressure, when the turbocharger 14 is activated.

When the turbocharger 14 is generating pressurized air during the second mode of operation, and purge vapor is passing through the purge valve assembly 22, some level of vaccum is detectable in the canister 30 by a pressure sensor 32. By placing the solenoid assembly 68 in the closed position, flow through the venturi valve assembly 24 is reduced, exposing the sixth conduit 20f and the canister 30 to less vacuum pressure, which is detected by the sensor 32. If there is a pressure change detected by the sensor 32 in the canister 30 when the solenoid assembly 68 is changed between the open and closed positions, a malfunction has occurred, such as the sixth conduit 20f becoming disconnected from either the canister 30 or the inlet port 132, and a malfunction light may be used to alert the vehicle driver the malfunction has occurred.

Another function of the turbo purge valve assembly 22 is the relief of vacuum pressure in the canister 30 and the fuel tank of the vehicle after the vehicle is shut off. Due to fuel consumption over time, the fuel flows out of the fuel tank to the engine, creating vacuum pressure in the fuel tank and the canister. The turbo purge valve assembly 22 is capable of relieving this vacuum pressure. To relieve the vacuum pressure, the solenoid assembly 68 is pulsated after the vehicle is shut off. In one embodiment, the solenoid assembly 68 is pulsated at 10 Hz, but it is within the scope of the invention that the solenoid assembly 68 may be pulsated at other frequencies. This pulsation opens one of the check valves 60,62 to allow air to flow from one of the ports 64,66 into the cavity 94, and then through the aperture 90 and into the cavity 92. The air flows back into the cavity 92, through the sixth conduit 20f, the canister 30, and into the fuel tank, relieving the vacuum pressure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   an integrated valve assembly which is part of an air flow system, including:
     a solenoid assembly having an open position and a closed position;
     a first valve in fluid communication with the solenoid assembly, the first valve unbiased open or closed; and
     a second valve in fluid communication with the solenoid assembly, the second valve unbiased open or closed;
     wherein during a first mode of operation and the solenoid assembly is in an open position, vacuum pressure places the first valve in an open position and the second valve in a closed position, and during the second mode of operation and the solenoid assembly is in an open position, pressurized air places the first valve in a closed position, and vacuum pressure places the second valve in an open position.

2. The apparatus of claim 1, further comprising:
   an overmold assembly, the solenoid assembly located in the overmold assembly;
   a cap connected to the overmold assembly;
   a reservoir connected to the cap;
   a cap aperture formed as part of the cap, the cap aperture providing fluid communication between the overmold assembly and the reservoir when the solenoid assembly is in an open position; and
   wherein purge vapor flows from the overmold assembly through the cap aperture to the reservoir during both the first mode of operation and the second mode of operation.

3. The apparatus of claim 2, further comprising:
   an overmold assembly cavity formed as part of the overmold assembly, the solenoid assembly disposed within the overmold assembly adjacent the overmold assembly cavity; and
   a reservoir cavity formed as part of the reservoir, the cap aperture in fluid communication with the reservoir cavity and the overmold assembly cavity;
   wherein the reservoir cavity is in fluid communication with the overmold assembly cavity when the solenoid assembly is in the open position.

4. The apparatus of claim 2, wherein the first valve is a first check valve, further comprising:
   a first valve plate moveable between an open position and a closed position;
   a first valve seat selectively in contact with the first valve plate; and
   a first plurality of vents;
   wherein during the first mode of operation, the first valve plate is located such that the first check valve is in the open position, allowing purge vapor to flow from the reservoir through the first check valve, and through the first plurality of vents, and during the second mode of operation, pressurized air places the first valve plate in contact with the first valve seat such that purge vapor is prevented from entering the first check valve.

5. The apparatus of claim 4, the first check valve further comprising:
   a first seal member connected to and circumscribing the first valve plate, the first seal member selectively in contact with the first valve seat;
   a first inner wall, the first seal member selectively in contact with the first inner wall;
   a first check valve aperture in fluid communication with the reservoir, the first check valve aperture surrounded by the first valve seat; and
   a first check valve cavity, the first check valve aperture in fluid communication with the first check valve cavity;
   wherein during the first mode of operation, the first valve plate is located in the first check valve cavity and moves away from the first valve seat, placing the first check valve in the open position, allowing purge vapor to flow from the reservoir through the first check valve aperture, into the first check valve cavity, and out of the first check valve, and during the second mode of operation, pressurized air places the first seal member in contact with the first valve seat, preventing purge vapor from entering the first check valve cavity from the reservoir.

6. The apparatus of claim 5, the first check valve further comprising
   a first base portion, the first inner wall formed as part of the first base portion;
   a first vent port integrally formed with the first base portion; and
   a first guide member at least partially extending into the reservoir cavity and partially extending into the first vent port, the first valve plate integrally formed with the first guide member;
   wherein during the first mode of operation, the first valve plate moves such that the first seal member contacts the first inner wall, allowing purge vapor to flow from the reservoir through the first check valve aperture, through the first check valve cavity, and through the first plurality of vents and out of the first vent port, and during the second mode of operation, pressurized air moves the first valve plate such that the first seal member is in contact with the first valve seat, preventing purge vapor from entering the first check valve cavity from the reservoir.

7. The apparatus of claim 2, wherein the second valve is a second check valve, further comprising:
   a second valve plate moveable between an open position and a closed position;
   a second valve seat selectively in contact with the second valve plate; and
   a second plurality of vents formed as part of the base portion;

wherein during the first mode of operation, the second valve plate is located such that the second valve plate is in contact with the second valve seat and in the closed position, such that purge vapor is prevented from entering the second check valve, and during the second mode of operation, the second valve plate is moved away from the second valve seat, placing the second check valve in the open position, allowing purge vapor to flow from the reservoir through the second check valve, and through the second plurality of vents.

8. The apparatus of claim 7, the second check valve further comprising:
a second seal member connected to and circumscribing the second valve plate;
a second inner wall, the second seal member selectively in contact with the second inner wall;
a second check valve aperture in fluid communication with the reservoir, the second check valve aperture at least partially surrounded by the second valve seat; and
a second check valve cavity, the second check valve aperture in fluid communication with the second check valve cavity;
wherein during the first mode of operation, the second valve plate is located in the second check valve cavity, is in contact with the second valve seat, and is in the closed position, preventing purge vapor from entering the second check valve cavity from the reservoir, and during the second mode of operation, the second valve plate moves away from the second valve seat, placing the second check valve in the open position, allowing purge vapor to flow from the reservoir through the second check valve aperture, into the second check valve cavity, and out of the second check valve.

9. The apparatus of claim 8, the second check valve further comprising:
a second base portion, the second inner wall formed as part of the base portion;
a second vent port integrally formed with the second base portion; and
a second guide member at least partially extending into the reservoir cavity and partially extending into the second vent port, the second valve plate integrally formed with the second guide member;
wherein during the first mode of operation, the second seal member is in contact with the second valve seat, preventing purge vapor from entering the second check valve cavity from the reservoir, and during the second mode of operation, the second valve plate moves toward and contacts the second inner wall, allowing purge vapor to flow from the reservoir through the second check valve aperture, through the second check valve cavity, and through the second plurality of vents and out of the second vent port.

10. The apparatus of claim 1, further comprising:
a canister containing purge vapor, the canister being part of the air flow system, and in fluid communication with the integrated valve assembly; and
a pressure sensor for detecting a change in pressure in the canister, the pressure sensor being part of the air flow system;
wherein the integrated valve assembly is part of the air flow system, and performs an on-board diagnostic test for detecting a malfunction in the air flow system.

11. The apparatus of claim 10, further comprising a canister vacuum relief function, wherein the solenoid assembly is pulsated after the vehicle is shut off, such that the pulsation of the solenoid assembly generates an air pulsation in the reservoir cavity, opening one of the first check valve or the second check valve, allowing air to pass from either of the first vent port or the second vent port into the reservoir cavity, through the solenoid assembly, through the overmold assembly cavity, and into the canister to relieve vacuum pressure in the canister.

12. The apparatus of claim 10, further comprising:
a turbocharger unit for generating the pressurized air such that a portion of the pressurized air flows into the first valve of the integrated valve assembly, the turbocharger unit being part of the air flow system;
wherein during the on-board diagnostic test, the air flow system is in the second mode of operation, and the turbocharger unit is generating pressurized air, the solenoid assembly is placed in the closed position, and the pressure sensor detects a malfunction in the canister or the turbo purge valve assembly when a change of pressure in the canister occurs.

13. The apparatus of claim 12, wherein the first valve is unbiased towards the open position or the closed position, and the second valve is unbiased towards the open position or closed position, allowing both the first valve and the second valve to transition between open and closed positions, as the turbocharger unit is activated and deactivated.

14. The apparatus of claim 1, wherein the integrated valve assembly is oriented such that gravity biases the first valve to the open position.

15. The apparatus of claim 1, wherein the integrated valve assembly is oriented such that gravity biases the first valve to the closed position.

16. The apparatus of claim 1, wherein the integrated valve assembly is oriented such that gravity biases the second valve to the open position.

17. The apparatus of claim 1, wherein the integrated valve assembly is oriented such that gravity biases the second valve to the closed position.

18. A turbo purge valve assembly, comprising:
an overmold assembly;
a cap connected to the overmold assembly;
a reservoir connected to the cap, such that the reservoir is in fluid communication with the overmold assembly through the cap;
a solenoid assembly located in the overmold assembly, the solenoid assembly able to change between an open position and a closed position, such that when the solenoid assembly is in the open position, purge vapor is able to pass from the overmold assembly through the cap and into the reservoir;
a first check valve in fluid communication with the reservoir and an intake manifold, the first check valve unbiased open or closed; and
a second check valve in fluid communication with the reservoir and a venturi valve assembly, the second check valve unbiased open or closed;
wherein during a first mode of operation and the solenoid assembly is in an open position, vacuum pressure from the intake manifold places the first check valve in an open position and the second check valve in a closed position, and during the second mode of operation and the solenoid assembly is in an open position, pressurized air places the first check valve in a closed position, and vacuum pressure generated by the venturi valve member places the second check valve in an open position.

19. The turbo purge valve assembly of claim 18, further comprising:
an overmold assembly cavity formed as part of the overmold assembly;

a reservoir cavity formed as part of the reservoir; and
a cap aperture formed as part of the cap;
wherein the cap aperture provides fluid communication between the overmold assembly cavity and the reservoir cavity when the solenoid assembly is in the open position.

20. The turbo purge valve assembly of claim 18, the first check valve further comprising:
a first valve member moveable between an open position and a closed position;
a first valve seat selectively in contact with the first seal member;
a first check valve aperture in fluid communication with the reservoir, the first check valve aperture at least partially surrounded by the first valve seat;
a first base portion;
a first plurality of vents formed as part of the first base portion; and
a first check valve cavity, the first plurality of vents and the first check valve aperture in fluid communication with the first check valve cavity;
wherein during the first mode of operation, the first valve member is located in the first check valve cavity and moves away from the first valve seat, placing the first check valve in the open position, allowing purge vapor to flow from the reservoir through the first check valve aperture, through the first check valve cavity, and through the first plurality of vents, and during the second mode of operation, pressurized air places the first valve member in contact with the first valve seat, preventing purge vapor from entering the first check valve cavity from the reservoir.

21. The turbo purge valve assembly of claim 20, the first check valve further comprising:
a first seal member connected to and circumscribing the first valve plate;
a first inner wall formed as part of the first base portion, the first seal member selectively in contact with the first inner wall;
a first vent port integrally formed with the first base portion; and
a first guide member at least partially extending into the reservoir and partially extending into the first vent port, the first valve plate integrally formed with the first guide member;
wherein during the first mode of operation, the first valve member moves such that the first seal member contacts the first inner wall, allowing purge vapor to flow from the reservoir through the first check valve aperture, through the first check valve cavity, and through the first plurality of vents and out of the first vent port, and during the second mode of operation, pressurized air moves the first valve member such that the first seal member is contact with the first valve seat, preventing purge vapor from entering the first check valve cavity from the reservoir.

22. The turbo purge valve assembly of claim 18, the second check valve further comprising:
a second valve plate moveable between an open position and a closed position;
a second valve seat selectively in contact with the second seal member;
a second check valve aperture in fluid communication with the reservoir, the second check valve aperture at least partially surrounded by the second valve seat;
a second base portion;
a second plurality of vents formed as part of the second base portion; and
a second check valve cavity, the second plurality of vents and the second check valve aperture in fluid communication with the second check valve cavity;
wherein the second valve plate is located in the second check valve cavity, and during the first mode of operation, vacuum pressure in the reservoir places the second valve plate in contact with the second valve seat, preventing purge vapor from entering the second check valve cavity from the reservoir, and during the second mode of operation, the second valve plate moves away from the second valve seat, placing the second check valve in the open position, allowing purge vapor to flow from the reservoir through the second check valve aperture, through the second check valve cavity, and through the second plurality of vents.

23. The turbo purge valve assembly of claim 22, the second check valve further comprising:
a second seal member connected to and circumscribing the second valve plate;
a second inner wall formed as part of the second base portion, the second seal member selectively in contact with the second inner wall;
a second vent port integrally formed with the second base portion; and
a second guide member at least partially extending into the reservoir and partially extending into the second vent port, the second valve plate integrally formed with the second guide member;
wherein during the first mode of operation, vacuum pressure from the reservoir moves the second valve member such that the second seal member is contact with the second valve seat, preventing purge vapor from entering the second check valve cavity from the reservoir, and during the second mode of operation, the second valve member moves such that the second seal member contacts the second inner wall, allowing purge vapor to flow from the reservoir through the second check valve aperture, through the second check valve cavity, and through the second plurality of vents and out of the second vent port.

24. The turbo purge valve assembly of claim 18, further comprising:
an air flow system for a vehicle;
a turbocharger unit for generating the pressurized air such that a portion of the pressurized air flows into the first check valve of the turbo purge valve assembly during the second mode of operation, the turbocharger unit being part of the air flow system of the vehicle;
a canister containing purge vapor, the canister part of the air flow system for the vehicle, and in fluid communication with the turbo purge valve assembly; and
a pressure sensor for detecting a change in pressure in the canister, the pressure sensor being part of the purge flow system of the vehicle;
wherein the turbo purge valve assembly is part of the air flow system, and performs an on-board diagnostic test for detecting a malfunction in the air flow system.

25. The turbo purge valve assembly of claim 24, wherein during the on-board diagnostic test, the air flow system is in the second mode of operation, and the turbocharger unit is generating pressurized air, the solenoid assembly is placed in the closed position, and the pressure sensor detects a malfunction in the canister or the turbo purge valve assembly when a change of pressure in the canister occurs.

26. The turbo purge valve assembly of claim 24, further comprising a canister vacuum relief function, wherein the solenoid assembly is pulsated after the vehicle is shut off, such that the pulsation of the solenoid assembly generates an air pulsation in the reservoir cavity, opening one of the first check valve or the second check valve, allowing air to pass from either of the first vent port or the second vent port into the reservoir cavity, through the solenoid assembly, through the overmold assembly cavity, and into the canister to relieve vacuum pressure in the canister.

27. The turbo purge valve assembly of claim 24, wherein the first check valve is unbiased towards the open position or the closed position, and the second check valve is unbiased towards the open position or closed position, allowing both the first check valve and the second check valve to transition between open and closed positions, reducing turbo lag as the turbocharger is activated and deactivated.

28. The turbo purge valve assembly of claim 18, wherein the turbo purge valve assembly is oriented such that gravity biases the first check valve to the open position.

29. The turbo purge valve assembly of claim 18, wherein the turbo purge valve assembly is oriented such that gravity biases the first check valve to the closed position.

30. The turbo purge valve assembly of claim 18, wherein the turbo purge valve assembly is oriented such that gravity biases the second check valve to the open position.

31. The turbo purge valve assembly of claim 18, wherein the turbo purge valve assembly is oriented such that gravity biases the second check valve to the closed position.

32. A turbo purge valve assembly comprising:
an overmold assembly;
an overmold assembly cavity formed as part of the overmold assembly;
a solenoid assembly located in the overmold assembly adjacent the overmold assembly cavity;
a cap connected to the overmold assembly;
a reservoir connected to the cap;
a reservoir cavity formed as part of the reservoir;
a cap aperture formed as part of the cap, the cap aperture providing fluid communication between the overmold assembly cavity and the reservoir cavity when the solenoid assembly is in an open position;
a first check valve connected to the reservoir, the first check valve in fluid communication with an intake manifold and the reservoir cavity, the first check valve unbiased open or closed; and
a second check valve connected to the reservoir, the second check valve in fluid communication with a venturi valve member and the reservoir cavity, the first check valve unbiased open or closed;
wherein during a first mode of operation and the solenoid assembly is in an open position, vacuum pressure from the intake manifold places the first check valve in an open position and the second check valve in a closed position, and during the second mode of operation and the solenoid assembly is in an open position, pressurized air places the first check valve in a closed position, and vacuum pressure generated by the venturi valve member places the second check valve in an open position.

33. The turbo purge valve assembly of claim 32, the first check valve further comprising:
a first valve plate moveable between an open position and a closed position;
a first seal member connected to and circumscribing the first valve plate;
a first valve seat selectively in contact with the first seal member;
a first check valve aperture in fluid communication with the reservoir cavity, the first check valve aperture surrounded by the first valve seat;
a first base portion;
a first inner wall formed as part of the first base portion, the first seal member selectively in contact with the first inner wall;
a first plurality of vents formed as part of the first base portion;
a first check valve cavity, the first plurality of vents and the first check valve aperture in fluid communication with the first check valve cavity;
a first vent port integrally formed with the first base portion; and
a first guide member at least partially extending into the reservoir cavity and partially extending into the first vent port, the first valve plate integrally formed with the first guide member;
wherein during the first mode of operation, the first valve plate is located in the first check valve cavity and moves toward and contacts the first inner wall placing the first check valve in the open position, allowing purge vapor to flow from the reservoir cavity through the first check valve aperture, through the first check valve cavity, and through the first plurality of vents and out of the first vent port, and during the second mode of operation, pressurized air places the first seal member of the first valve plate in contact with the first valve seat, preventing purge vapor from entering the first check valve cavity from the reservoir cavity.

34. The turbo purge valve assembly of claim 32, the second check valve further comprising:
a second valve plate moveable between an open position and a closed position;
a second seal member connected to and circumscribing the second valve plate;
a second valve seat selectively in contact with the second seal member;
a second check valve aperture in fluid communication with the reservoir cavity, the second check valve aperture surrounded by the second valve seat;
a second base portion;
a second inner wall formed as part of the second base portion, the second seal member selectively in contact with the second inner wall;
a second plurality of vents formed as part of the second base portion;
a second check valve cavity, the second plurality of vents and the second check valve aperture in fluid communication with the second check valve cavity;
a second vent port integrally formed with the second base portion; and
a second guide member at least partially extending into the reservoir cavity and partially extending into the second vent port, the second valve plate integrally formed with the second guide member;
wherein the second valve plate is located in the second check valve cavity, and during the first mode of operation, vacuum pressure from the intake manifold places the second valve plate in contact with the second valve seat, preventing purge vapor from entering the second check valve cavity from the reservoir cavity, and during the second mode of operation, vacuum pressure from the venturi valve member moves the second valve plate away from the second valve seat and toward the second inner wall, placing the second check valve in the open position, allowing purge vapor to flow from the reservoir cavity through the second check valve aperture, through the second check valve cavity, and through the second plurality of vents and out of the second vent port.

35. The turbo purge valve assembly of claim 32, further comprising:
    an air flow system for a vehicle;
    a turbocharger unit for generating the pressurized air such that a portion of the pressurized air flows into the first check valve of the turbo purge valve assembly, the turbocharger unit being part of the air flow system of the vehicle;
    a canister containing purge vapor, the canister part of the air flow system for the vehicle, and in fluid communication with the turbo purge valve assembly; and
    a pressure sensor for detecting a change in pressure in the canister, the pressure sensor being part of the purge flow system of the vehicle;
    wherein the turbo purge valve assembly is part of the air flow system, and performs an on-board diagnostic test for detecting a malfunction in the air flow system such that during the on-board diagnostic test, the air flow system is in the second mode of operation, and the turbocharger unit is generating pressurized air, the solenoid assembly is placed in the closed position, and the pressure sensor detects a malfunction in the canister or the turbo purge valve assembly when a change of pressure in the canister occurs after the solenoid assembly is placed in the closed position.

36. The turbo purge valve assembly of claim 35, further comprising a canister vacuum relief function, wherein the solenoid assembly is pulsated after the vehicle is shut off, such that the pulsation of the solenoid assembly generates an air pulsation in the reservoir cavity, opening one of the first check valve or the second check valve, allowing air to pass from either of the first check valve or the second check valve into the reservoir cavity, through the solenoid assembly, through the overmold assembly cavity, and into the canister to relieve vacuum pressure in the canister.

37. The turbo purge valve assembly of claim 35, wherein the first check valve is unbiased towards the open position or the closed position, and the second check valve is unbiased towards the open position or closed position, allowing both the first check valve and the second check valve to transition between open and closed positions, reducing turbo lag as the turbocharger is activated and deactivated.

38. The turbo purge valve assembly of claim 32, wherein the turbo purge valve assembly is oriented such that gravity biases the first check valve to the open position.

39. The turbo purge valve assembly of claim 32, wherein the turbo purge valve assembly is oriented such that gravity biases the first check valve to the closed position.

40. The turbo purge valve assembly of claim 32, wherein the turbo purge valve assembly is oriented such that gravity biases the second check valve to the open position.

41. The turbo purge valve assembly of claim 32, wherein the turbo purge valve assembly is oriented such that gravity biases the second check valve to the closed position.

* * * * *